(12) United States Patent
Schaefer et al.

(10) Patent No.: US 12,055,103 B2
(45) Date of Patent: Aug. 6, 2024

(54) FUEL SYSTEM WITH REDUCED BYPASS FLOW

(71) Applicants: Paul J. Schaefer, Rockton, IL (US); Jordan L. Loos, Rockford, IL (US); Brett J. Snodgrass, Byron, IL (US); Steven T. McLevige, Janesville, WI (US)

(72) Inventors: Paul J. Schaefer, Rockton, IL (US); Jordan L. Loos, Rockford, IL (US); Brett J. Snodgrass, Byron, IL (US); Steven T. McLevige, Janesville, WI (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/903,692

(22) Filed: Sep. 6, 2022

(65) Prior Publication Data
US 2024/0077037 A1    Mar. 7, 2024

(51) Int. Cl.
| | | |
|---|---|---|
| *F02C 9/30* | (2006.01) | |
| *F02C 7/232* | (2006.01) | |
| *F02C 9/26* | (2006.01) | |
| *F02C 9/28* | (2006.01) | |
| *F02C 7/22* | (2006.01) | |

(52) U.S. Cl.
CPC ................ *F02C 9/30* (2013.01); *F02C 7/232* (2013.01); *F02C 9/263* (2013.01); *F02C 9/28* (2013.01); *F02C 7/22* (2013.01); *F05D 2270/3061* (2013.01); *F05D 2270/62* (2013.01)

(58) Field of Classification Search
CPC .. F02C 9/30; F02C 7/232; F02C 9/263; F02C 9/28; F02C 7/22; F05D 2270/3061; F05D 2270/62
See application file for complete search history.

(56) References Cited

U.S. PATENT DOCUMENTS

| 6,102,001 | A | 8/2000 | McLevige | |
|---|---|---|---|---|
| 7,690,355 | B2* | 4/2010 | Emo | F02C 9/263 123/496 |
| 8,291,886 | B2 | 10/2012 | Mahoney et al. | |
| 8,739,811 | B2 | 6/2014 | Futa et al. | |
| 9,574,500 | B2 | 2/2017 | Kelly et al. | |
| 2003/0074884 | A1* | 4/2003 | Snow | F02C 9/48 60/764 |

(Continued)

*Primary Examiner* — Craig Kim
*Assistant Examiner* — Rene D Ford
(74) *Attorney, Agent, or Firm* — Reinhart Boerner Van Deuren P.C.

(57) ABSTRACT

Embodiments of a flow system are provided. The flow system includes a flow source device configured to receive fluid from a first flow line and output fluid on a second flow line. An output is in fluid communication with the flow source device on the second flow line. An actuation system is in fluid communication with the second flow line through a third flow line. A flow meter measures a flow rate in the second flow line without bypassing any fluid to the first flow line. A controller is in communication with the flow source device and the flow meter. The controller adjusts the flow source device to achieve a desired flow rate at the output based on a condition of the flow source device and the flow rate measured by the flow meter.

28 Claims, 6 Drawing Sheets

(56) References Cited

U.S. PATENT DOCUMENTS

| | | | | |
|---|---|---|---|---|
| 2003/0094001 | A1* | 5/2003 | Desai | B64D 31/06 |
| | | | | 60/791 |
| 2010/0064657 | A1* | 3/2010 | Mahoney | F02C 9/30 |
| | | | | 417/44.1 |
| 2020/0081405 | A1* | 3/2020 | Skertic | G05B 7/02 |
| 2020/0123986 | A1* | 4/2020 | Hahn | G05B 6/02 |
| 2020/0400074 | A1* | 12/2020 | Seki | F02C 9/30 |
| 2021/0010429 | A1* | 1/2021 | Brady | F02C 9/263 |
| 2022/0372941 | A1* | 11/2022 | Susca | F02C 7/22 |
| 2023/0204029 | A1* | 6/2023 | Ni | F04B 49/065 |
| | | | | 417/218 |

\* cited by examiner

FIG. 6

FUEL SYSTEM WITH REDUCED BYPASS FLOW

FIELD

This invention generally relates to a fluid flow system and, in particular, to a fluid flow system with reduced bypass flow.

BACKGROUND

Conventional commercial aircraft fuel systems use a fixed displacement fuel pump in which pump speed (and therefore pump flow) is proportional to engine speed. However, the engine may require very different amounts of fuel at the same speed depending upon the current operating condition (e.g., accelerating, decelerating, or steady-state). Likewise, a pump that is sized to provide required flow at one speed is typically oversized at other speeds, even at the maximum metered flow requirements. Excess pump flow is bypassed back to the inlet side of the pump. Bypassing flow in this manner increases the temperature of the fuel. Hotter fuel is undesirable as it reduces the amount of heat the fuel can absorb from fuel/oil heat exchange, thereby reducing engine system efficiency.

Attempts have been made to provide a low bypass flow system. For example, a variable displacement pump has been used in place of the fixed displacement pump to reduce bypass flow. In such a system, an electronic controller determines the required pump displacement. A linear variable displacement transformer (LVDT) from a flow sensing valve in the metered flow path provides one feedback input for the controller. The variable stator vane actuator piston also provides a feedback input for the controller. Based on these inputs, the controller sends a signal to a two-stage electrohydraulic servo valve (EHSV), which positions a servo valve mechanically linked to the pump. This scheme requires a variable bypass flow in excess of system demands to meet dynamic performance requirements (e.g., accommodating external disturbances and metered flow demand tracking). While this system provides improved dynamics, such improvement comes at the cost of introducing bypass flow into the metering system.

In view of the foregoing, Applicant has identified a need in the art for flow system that provides variable flow depending on operating conditions without also requiring fuel to be bypassed back to the inlet side of the pump.

BRIEF SUMMARY

Embodiments of the present disclosure relate to a flow system having reduced bypass flow while maintaining the responsiveness necessary to meet dynamic performance requirements. These and other advantages of the disclosed flow system, as well as additional inventive features, will be apparent from the description of the embodiments of the flow system provided herein.

According to an aspect, embodiments of the present disclosure relate to a flow system. The flow system includes a flow source device configured to receive fluid from a first flow line at a first energy and output fluid on a second flow line at a second energy. The second energy is different from the first energy. A first output is in fluid communication with the flow source device on the second flow line. A first actuation system is in fluid communication with the second flow line through a third flow line, and the first actuation system has an outlet in fluid communication with the first flow line. An actuator is coupled to the flow source device, and the actuator is configured to adjust the second energy of the flow source device. A first flow meter is disposed on the second flow line, and the first flow meter is configured to measure a first flow rate in the second flow line without bypassing any fluid to the first flow line. A controller is in communication with the flow source device, the first flow meter, and the actuator. The controller is configured to actuate the actuator to adjust the flow source device to achieve a desired flow rate at the first output based at least in part on a condition of the flow source device and the first flow rate measured by the first flow meter.

In one or more embodiments, the first actuator system includes at least one servo actuator. The controller is in communication with the at least one servo actuator, and the controller computes an estimated flow rate through the at least one servo actuator based on an actuation position of the servo actuator. The controller is configured to actuate the actuator to adjust the flow source device to achieve the desired flow rate at the first output based also at least in part on the estimated flow rate.

In one or more embodiments, the flow system also includes a second flow meter disposed on the third flow line. The second flow meter is configured to measure a second flow rate in the third flow line without bypassing any fluid to the first flow line. The controller is configured to actuate the actuator to adjust the flow source device to achieve the desired flow rate at the first output based also at least in part on the second flow rate measured by the second flow meter.

In one or more such embodiments, the flow system also includes a second actuation system in fluid communication with the second flow line through the third flow line. The second flow rate measured by the second flow meter is an aggregate flow rate of fluid flowing to the first actuation system and to the second actuation system.

In one or more other embodiments, the flow system also includes a second actuation system in fluid communication with the second flow line and a third flow meter configured to measure a third flow rate of fluid flowing through the second actuation system. The second flow rate measured by the second flow meter is only of fluid flowing through the first actuation system. The controller is configured to actuate the actuator to adjust the second flow rate of the flow source device to achieve the desired flow rate at the first output based also at least in part on the flow rate measured by the second flow meter and the third flow rate measured by the third flow meter.

In one or more embodiments, the first flow meter is an ultrasonic flow meter, Coriolis flow meter, turbine flow meter, momentum flow meter, angular momentum flow meter, orifice flow meter, strain gauge flow meter, optical flow meter, thermal dispersion flow meter, positive displacement flow meter, electromagnetic flow meter, flow sense valve, vortex shedding flow meter, oscillating jet flow meter, and differential lift flow meter.

In one or more embodiments, the first flow meter has a bandwidth of at least 10 Hz.

In one or more embodiments, the controller is configured to sample the flow rate measured by the first flow meter every 0.1 seconds or faster.

In one or more embodiments, the actuator is an electromagnetic actuator.

In one or more embodiments, the flow system includes a second output in fluid communication with the flow source device, and the first flow rate measured by the first flow meter is an aggregate flow rate of fluid flowing to the first output and to the second output.

In one or more other embodiments, the flow system includes a second output in fluid communication with the flow source device and a second flow meter configured to measure a second flow rate of fluid flowing to the second output. The first flow rate measured by the first flow meter is only of fluid flowing to the first output. The controller is configured to actuate the actuator to adjust the flow source device to achieve desired flow rates at the first output and the second output based at least in part on the first flow rate measured by the first flow meter and the second flow rate measured by the second flow meter.

In one or more embodiments, the controller comprises an open loop gain margin in at least 6 dB.

In one or more embodiments, the controller comprises an open loop phase margin of at least 45°.

In one or more embodiments, the flow source device is a rotary displacement pump, a reciprocating displacement pump, a centrifugal pump, a jet pump, an electromagnetic pump, an accumulator, or a potential energy pump.

In one or more embodiments, the controller adjusts the flow source device based on such a condition of the flow source device as a rotational speed, an axial speed, a rotational position, an axial position, an inlet pressure, an outlet pressure, a cam position, a swash plate position, a displacement, a fluid temperature at an inlet of the flow source device, and/or a fluid temperature at an outlet of the flow source device.

In one or more embodiments, the first output is a fuel manifold of an aircraft, and the first actuation system controls an end effector of the aircraft.

According to another aspect, embodiments of the disclosure relate to a method of controlling a flow system. In the method, energy of a fluid flowing through a flow source device to an output is changed. The fluid passes through a first flow line into the flow source device and a second flow line out of the flow source device to the output. A portion of the fluid on the second flow line is directed through a first actuation system on a third flow line. The first actuation system has an outlet in fluid communication with the first flow line. A first flow rate of fluid flowing through the second flow line is monitored using a first flow meter. No fluid is bypassed from the second flow line to the first flow line by the first flow meter during monitoring. A desired flow rate at the output is controlled by adjusting the flow source device using an actuator based at least in part on the first flow rate monitored by the first flow meter and a condition of the flow source device.

In one or more embodiments, the monitoring further includes monitoring a second flow rate of fluid flowing through the third flow line using a second flow meter. No fluid is bypassed from the third flow line to the first flow line by the second flow meter during monitoring. Further, the controlling further includes controlling the desired flow rate based also at least in part on the second flow rate monitored by the second flow meter.

In one or more embodiments, controlling further involves sampling the first flow rate every 0.1 seconds or faster using a controller. In one or more embodiments, controlling may also involve sampling the second flow rate every 0.1 seconds or faster using the controller.

In one or more embodiments, controlling further involves electromagnetically actuating the actuator to adjust the flow source device.

Other aspects, objectives and advantages of the disclosed flow system will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present disclosure and, together with the description, serve to explain the principles of the disclosed flow system. In the drawings.

While the flow system will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Figure 1:
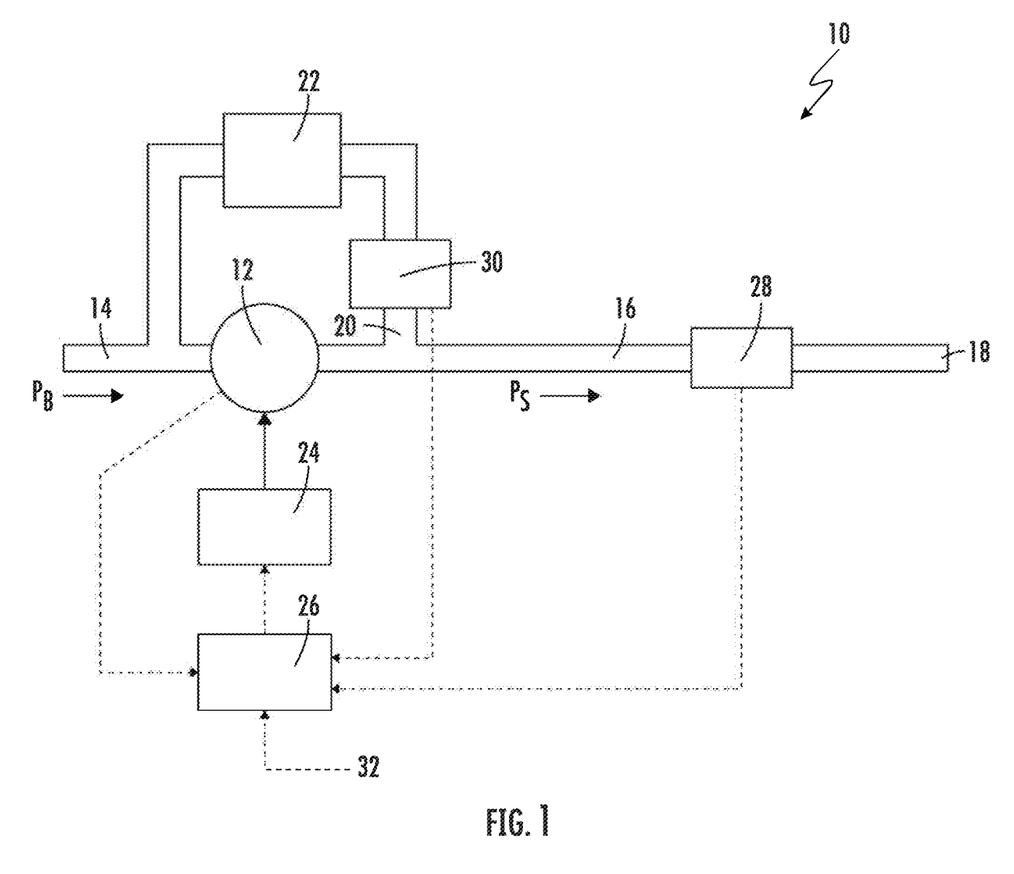
FIG. 1 is a schematic representation of a flow system, according to an exemplary embodiment of the present disclosure.

FIG. 1 depicts an embodiment of a flow system 10, such as a fuel control system (e.g., for an aircraft). The flow system 10 includes a flow source device 12 that receives fluid at a first energy on a first flow line 14, and the flow source device 12 ejects fluid at a second energy on a second flow line 16. The first energy is different from the second energy. For example and as depicted in FIG. 1, the fluid at the first energy is low pressure fluid $P_B$, and the fluid at the second energy is high pressure fluid $P_S$. In one or more other embodiments, the fluid at the first energy has a different flow rate than the fluid at the second energy. In one or more embodiments, the flow source device 12 is a rotary displacement pump (such as a screw pump, a progressive cavity pump, a gear pump, or a vane pump), a reciprocating displacement pump (such as a piston pump, a plunger pump, or a diaphragm pump), a centrifugal pump (such an axial, a mixed, or a peripheral/regenerative centrifugal pump), a jet pump, an electromagnetic pump, an accumulator, or a potential energy pump.

In the embodiment depicted, the fluid at the second energy (high pressure fluid $P_S$) is provided to an output 18 through which the fluid is provided to a downstream process, such as a fuel manifold and combustion chamber (not shown) for an exemplary embodiment of a fuel system. In such embodiments, the pressure $P_S$ of the fluid may be set by nozzles of the fuel manifold that eject fuel into the combustion chamber. In embodiments, the downstream process may need fluid of variable energy (e.g., pressure or flow rate), and the flow source device 12 regulates the energy of the fluid.

In addition, the fluid at the second energy (depicted as high-pressure fluid $P_S$) ejected from the flow source device 12 flows on a third flow line 20 to an actuation system 22 to control a mechanism. In one or more embodiments, the actuation system 22 includes a servo valve, such as an electrohydraulic servo valve (EHSV). In one or more embodiments, the servo valve is configured to actuate end effectors, such as flight control surfaces of an aircraft. The actuation system 22 has a drain that returns fluid to the input side of the flow source device 12.

The flow source device 12 is electrically, mechanically, electromechanically, or electromagnetically coupled to an actuator 24 that is controlled by a controller 26. In particular, the controller 26 receives a demand for a desired flow rate at the output 18, and the controller 26 actuates the actuator 24 to adjust the flow source device 12 to meet the desired flow rate. For example, the flow source device 12 may be a variable displacement vane pump (VDVP), and the actuator 24 may be a linear actuator configured to position a reaction ring within the VDVP to control the flow output in response to a command from the controller 26. In one or more embodiments, the actuator is a linear actuator or a rotary actuator. In one or more embodiments, the actuator is a linear electric actuator or a motor, such as a stepper motor.

As shown in FIG. 1, a first flow meter 28 is positioned on the second flow line 16 to monitor the flow to the output 18. According to embodiments of the present disclosure, the first flow meter 28 monitors the flow to the output 18 without bypassing any fluid to the input side of the flow source device 12. In one or more embodiments, the first flow meter 28 is an ultrasonic flow meter, Coriolis flow meter, turbine (single or dual) flow meter, momentum flow meter, angular momentum flow meter, orifice flow meter, strain gauge flow meter, optical flow meter, thermal dispersion flow meter, positive displacement flow meter, electromagnetic flow meter, flow sense valve, vortex shedding flow meter, oscillating jet flow meter, and differential lift flow meter. In one or more embodiments, the first flow meter 28 has a bandwidth of at least 10 Hz, more particularly at least 50 Hz, still more particularly at least 75 Hz, and in particular at least 100 Hz. In one or more embodiments, the first flow meter 28 has a bandwidth of up to 500 Hz, more particularly up to 1000 Hz, and in particular up to 2000 Hz. In one or more embodiments, the bandwidth of the first flow meter 28 is selected based on expected transients in the flow created by flow to the actuation system 22. That is, a first flow meter 28 with a comparatively high bandwidth may be used in conjunction with an actuation system 22 that creates more frequent transients in flow.

In one or more embodiments, the flow system 10 also includes a second flow meter 30 on the third flow line 20 to monitor the flow to the actuation system 22. According to embodiments of the present disclosure, the second flow meter 30 monitors the flow to the actuation system 22 without bypassing fluid to the input side of the flow source device 12. In one or more embodiments, the second flow meter 30 is an ultrasonic flow meter, Coriolis flow meter, turbine (single or dual) flow meter, momentum flow meter, angular momentum flow meter, orifice flow meter, strain gauge flow meter, optical flow meter, thermal dispersion flow meter, positive displacement flow meter, electromagnetic flow meter, flow sense valve, vortex shedding flow meter, oscillating jet flow meter, and differential lift flow meter. In one or more embodiments, the second flow meter 30 has a bandwidth of at least 10 Hz, more particularly at least 50 Hz, still more particularly at least 75 Hz, and in particular at least 100 Hz. In one or more embodiments, the second flow meter 30 has a bandwidth of up to 500 Hz, more particularly up to 1000 Hz, and in particular up to 2000 Hz. As mentioned above in relation to the first flow meter 28, the bandwidth of the second flow meter 30 may be selected based on expected transients in the flow created by flow to the actuation system 22.

In one or more embodiments, the flow rates measured by the first flow meter 28 and the second flow meter 30 are transmitted to the controller 26. The condition of the flow source device 12 is also transmitted to the controller 26. Various conditions of the flow source device 12 may be transmitted to the controller 26 depending on the type of flow source device 12 used in the flow system 10. In one or more embodiments, the condition of the flow source device 12 is at least one of the speed (rotational and/or axial), position (rotational and/or axial), pressure (inlet and/or outlet), displacement (e.g., cam position or swash plate position), or fluid temperature (at the inlet and/or outlet). For example, if the flow source device 12 is a VDVP, the radial speed of the VDVP is transmitted to the controller 26. In another example, if the flow source device 12 is a valve, the position of the valve is transmitted to the controller 26.

Thus, in a control scheme of the flow system 10, the controller 26 receives a command input 32 regarding a desired condition of the output 18, and the flow rate of the second flow line 16 is measured using first flow meter 28 to measure the current condition of the output 18 and to confirm when the desired condition of the output 18 is reached. Further, because the actuation system 22 is connected to the second flow line 16 via the third flow line 20, the condition of flow to the actuation system 22 is relevant in achieving the desired condition of the output 18, and the flow rate of the third flow line 16 as measured by the second flow meter 30 is fed back to the controller 26. In addition, the controller 26 monitors the condition of the flow source device 12 and adjusts the condition of the flow source device 12 using the actuator 24 based on the flow rate information from the first flow meter 28 and from the second flow meter 30. In this way, the desired condition of the output 18 can be achieved and maintained despite potential disturbances to the flow rate on the second flow line 16 caused by supply fluctuations when the actuation system 20 is actuated.

In one or more embodiments, the controller 26 samples the flow rates every 0.1 seconds or faster, every 0.05 seconds or faster, every 0.01 seconds or faster, every 0.005 seconds or faster, or every 0.003 seconds or faster. In one or more embodiments, the controller 26 samples the flow rates about every 0.002 seconds.

According to embodiments of the present disclosure, the structure of the controller 26 is not particularly limited and can be any of a variety of structures known in the art for receiving the flow rate information, the condition of the flow source device, and the demanded flow rate and carry out programmed instructions to cause the flow source device 12 to achieve the flow rate demand. In one or more embodiments, the controller 26 is a microcontroller (MCU) or a system on a chip (SoC). In one or more embodiments, the controller 26 includes a processor, such as a microprocessor, and memory, such as a system memory and a program memory, in which the processor is configured to carry out program instructions stored in the memory. In one or more embodiments, the controller 26 is a field programmable gate array (FPGA) or an application specific integrated circuit (ASIC).

Figure 2:
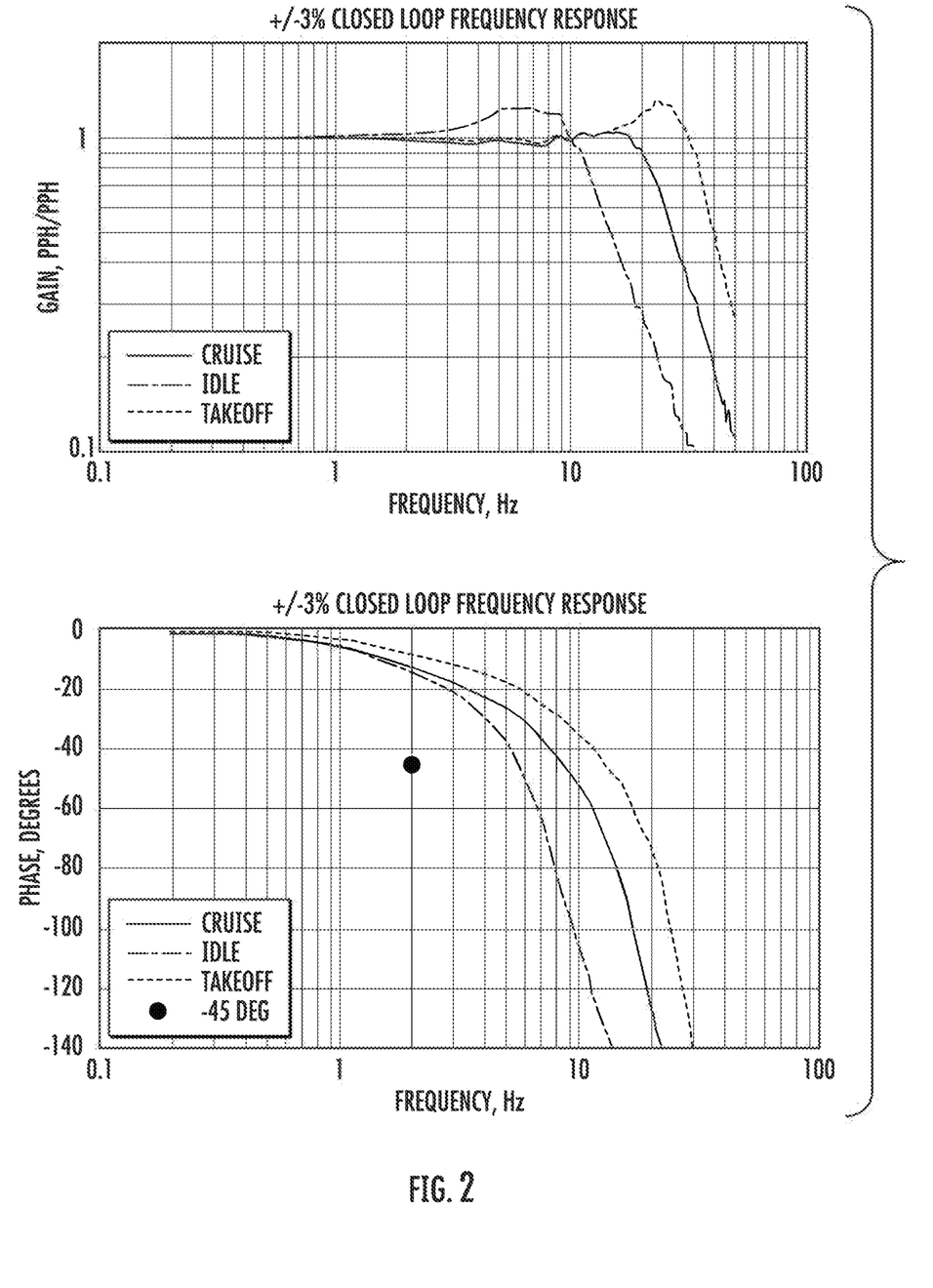
FIG. 2 includes graphs of the gain and phase shift as a function of frequency for a flow system analyzed using closed loop frequency response, according to exemplary embodiments of the present disclosure.
Figure 3:
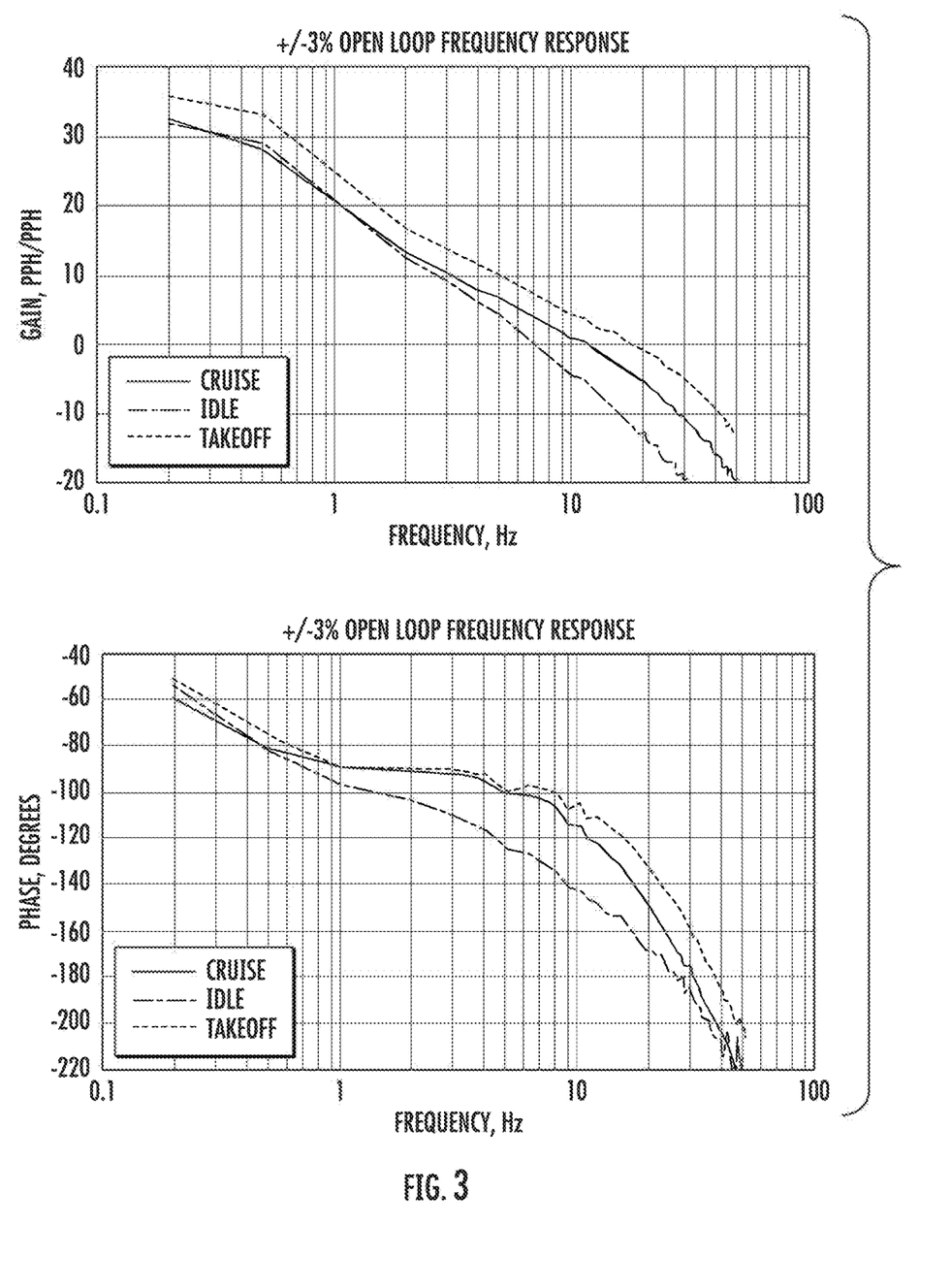
FIG. 3 includes graphs of the gain and phase shift as a function of frequency for a flow system analyzed using open loop frequency response, according exemplary embodiments of the present disclosure.

FIGS. 2 and 3 provide graphs of the modeled closed-loop frequency response of the flow system 10 and the modeled open-loop frequency response of the flow system 10. The flow systems 10 were modeled for aircraft fuel systems in three conditions: idle, cruise, and takeoff. As shown in the graphs of FIGS. 2 and 3, the idle condition provides a lower bound for frequency response, and the takeoff condition provides an upper bound. FIG. 2 depicts the gain (ratio of modeled flow rate at the output divided by the demanded flow rate) and the phase shift, respectively, as functions of frequency for a +/−3% closed loop frequency response. FIG. 3 depicts gain and phase shift, respectively, as functions of frequency for a +/−3% open loop frequency response. As can be seen in FIG. 2, the 45° phase shift corresponds to a frequency of 5.6 Hz for the idle condition and a frequency of 13.1 Hz at the takeoff condition. As compared to conventional systems, the cutoff frequencies were in the range of 2 Hz to 3 Hz. Accordingly, the disclosed flow system has a larger bandwidth over which the system operates stably and efficiently.

As can be seen in FIG. 3, the open loop phase margin was in a range from 48° to 59°, which is indicative of a stable control system, and the open loop gain margin is at least 8 dB (i.e., a gain of less than 0.40 at a phase shift of 180°), which is also indicative of a stable control system. In one or more embodiments, the open loop gain margin in at least 6 dB and/or the open loop phase margin is at least 45°

The embodiments described thus far have discussed flow systems 10 with a single output 18 and a single actuation system 22. However, in other embodiments, the flow system 10 includes multiple outputs 18, multiple actuation systems 22, or both multiple outputs 18 and multiple actuation systems 22. An embodiment of a flow system 10 having multiple outputs 18 and multiple actuation systems 22 is depicted in FIG. 4.

Figure 4:
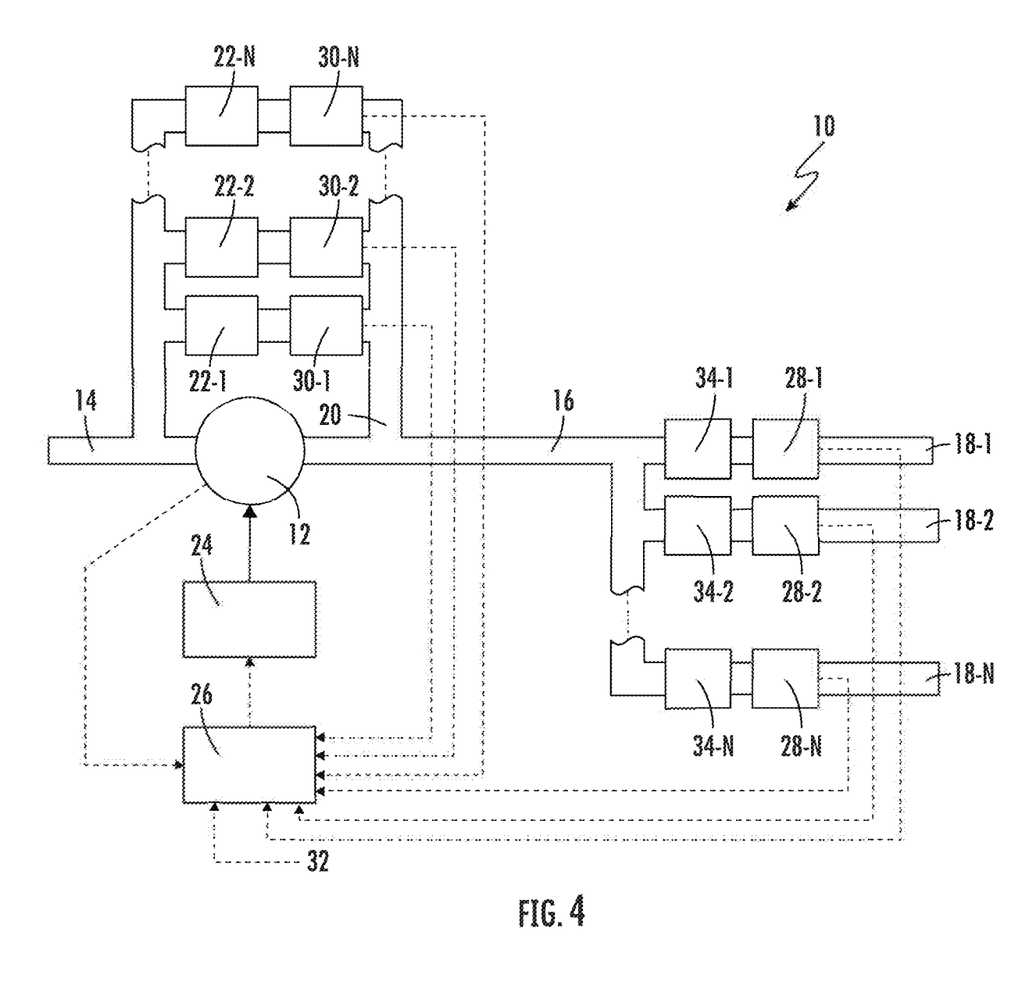
FIG. 4 is a schematic representation of a flow system having multiple outputs and multiple actuation systems, according to exemplary embodiments of the present disclosure.

As shown in FIG. 4, the second flow line 16 carrying fluid from the flow source device 12 provides fluid to a plurality of outputs 18-1, 18-2, . . . 18-N. For example, in a flow system 10 that is an aircraft, the plurality of outputs 18-1, 18-2, . . . 18-N may correspond to a pilot manifold, a secondary manifold, and an afterburner manifold, among other possibilities. In one or more embodiments, the flow system 10 includes up to ten outputs 18. As shown in FIG. 4, in one or more embodiments, each output 18-1, 18-2, . . . 18-N comprises split flow control valves 34-1, 34-2, . . . 34-N configured to adjust the flow rate at which the fluid is delivered to each output 18-1, 18-2, . . . 18-N. Further, in one or more embodiments, the first flow meter 28 may be positioned on the second flow line 16 upstream of the division between the outputs 18-1, 18-2, . . . 18-N such that the flow rate measured is based on the aggregate flow rate of all the outputs 18-1, 18-2, . . . 18-N. In one or more other embodiments, including the embodiment shown in FIG. 4, a first flow meter 28-1, 28-2, . . . 28-N is positioned on each flow line leading into each output 18-1, 18-2, . . . 18-N such that the flow rate to each output 18-1, 18-2, . . . 18-N is measured. The flow rate as measured by the first flow meter 28 or the plurality of first flow meters 28-1, 28-2, . . . 28-N is fed back to the controller 26.

FIG. 4 also shows the third flow line 20 carrying fluid from the flow source device 12 to a plurality of actuation systems 22-1, 22-2, . . . 22-N. For example, in a flow system 10 that is an aircraft, each actuation system 22-1, 22-2, . . . 22-N can be used to control a respective end effector, such as a flight control surface, of the aircraft. In one or more embodiments, the flow system 10 includes up to ten actuation systems 22. In one or more embodiments, the second flow meter 30 may be positioned on the third flow line 20 upstream of the division between the actuation systems 22-1, 22-2, . . . 22-N such that the flow rate measured by the second flow meter 30 is based on the aggregate flow rate of all the actuation systems 22-1, 22-2, . . . 22-N. In one or more other embodiments, including the embodiment shown in FIG. 4, a second flow meter 30-1, 30-2, . . . 30-N is positioned on each flow line leading into each actuation system 22-1, 22-2, . . . 22-N. The flow rate as measured by the second flow meter 30 or the plurality of second flow meters 30-1, 30-2, . . . 30-N is fed back to the controller 26.

Figure 5:
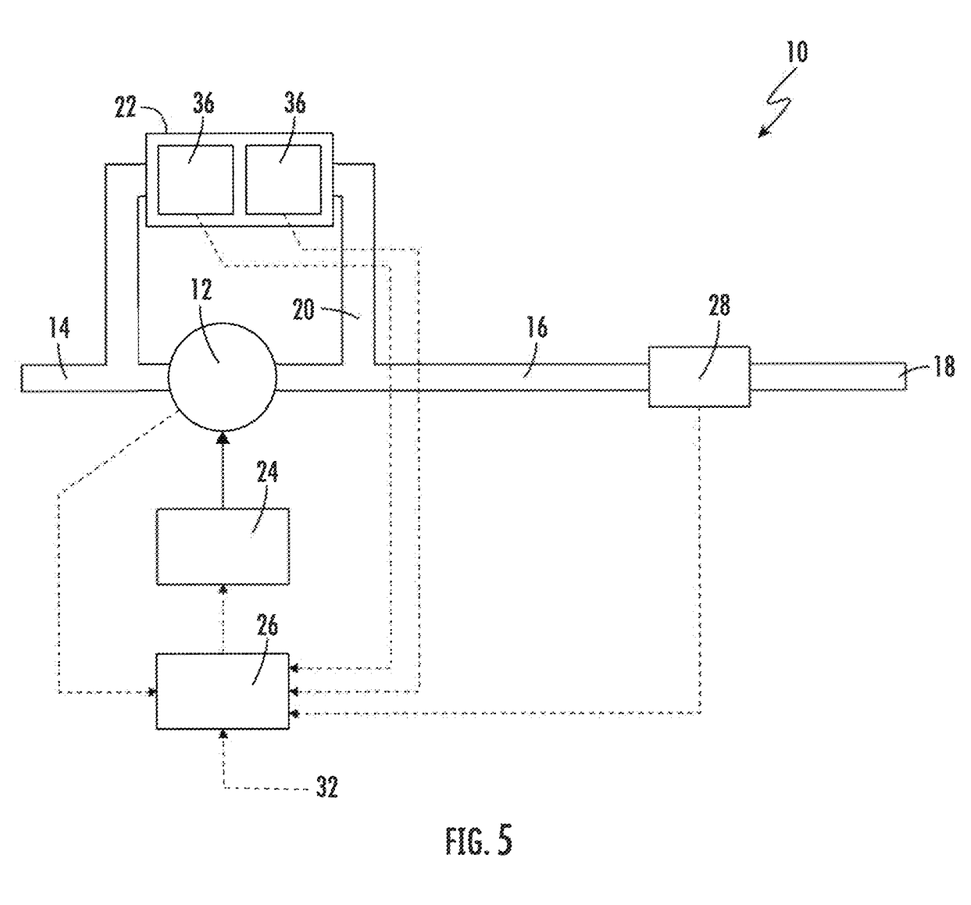
FIG. 5 is a schematic representation of a flow system having an actuation system in which flow through the actuation system is estimated based on positions of servo actuators within the actuation system, according to an exemplary embodiment of the present disclosure.

FIG. 5 depicts another embodiment of the flow system 10 in which only the output 18 has a flow meter (i.e., first flow meter 28). In one or more embodiments, the actuation system 22 does not include a flow meter. Applicant has found that, in most engine systems for aircraft, only one or two actuator systems 22 have servo actuator loops capable of producing large servo flow disturbances on the second flow line 16 to the output 18. In such embodiments, the flow rate through the actuator system 22 is estimated based on the position of actuators 36 within the actuator system 22. Thus, the position actuator 36 or actuators 36 within the actuator system 22 is fed back to the controller 26 for adjusting of the flow source device 12 based on the demanded flow rate. While FIG. 5 depicts a single output 18 and a single actuation system 22, the flow system 10 can include multiple outputs 18 and multiple actuation systems 22. Further, in one or more embodiments having multiple actuation systems 22, a second flow meter 30 may be provided in line with any actuation system 22 having large flow rates, and the flow rates of the remaining actuation systems may be estimated from the position of the actuators 36 in the actuation system.

Figure 6:
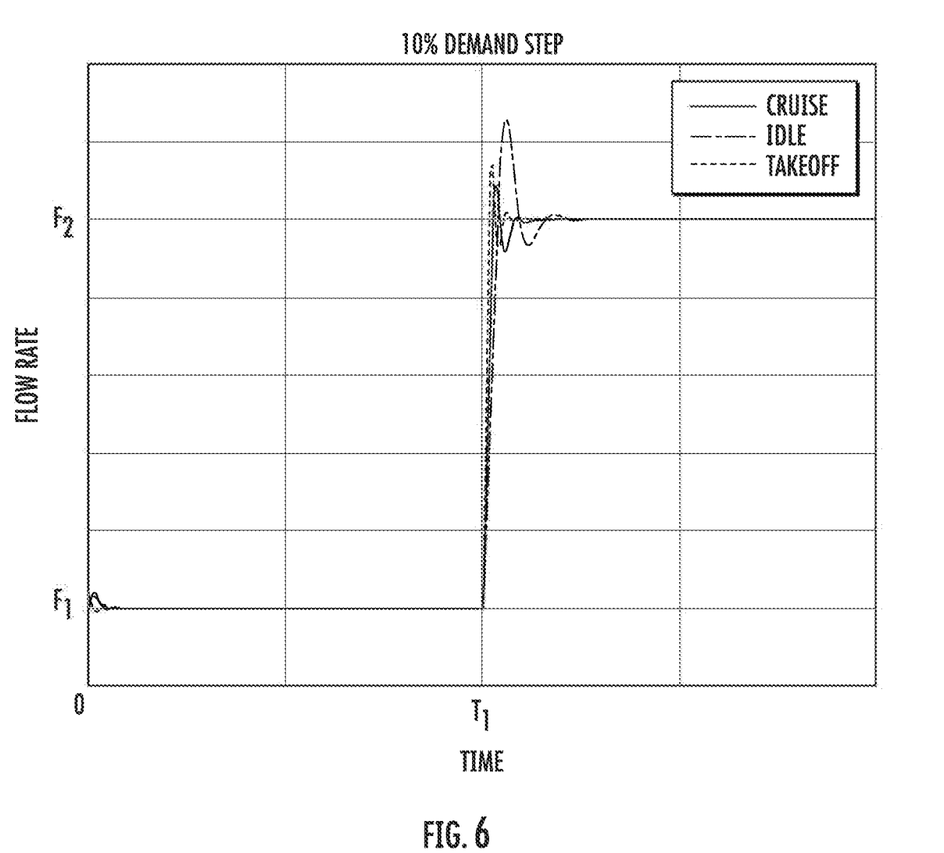
FIG. 6 depicts a graph of the measured flow rate when changing from a first desired flow rate to a second desired flow rate, according to an exemplary embodiment of the present disclosure.

FIG. 6 depicts a graph showing a change in the demanded flow rate for a flow system of an aircraft. Three operating conditions were considered: idle, cruise, and takeoff. As can be seen in FIG. 6, the flow rate is at a first flow rate $F_1$ until a first time $T_1$. At the first time $T_1$, the demanded flow rate is increased by 10% to a second flow rate $F_2$. The flow system is able to quickly stabilize at the second flow rate $F_2$, demonstrating the ability of the flow system to dynamically respond to system requirements despite the elimination of bypass flow from the flow system.

The flow systems according to the present disclosure reduce the amount of bypass flow in the system, thereby reducing the temperature of the fluid in the system. In this way, the flow system operates more efficiently, and the fluid can be used to provide cooling of system components. Bypass flow is avoided by replacing various flow sensing valves with flow meters, such as ultrasonic flow meters. Further, response times are improved through electronic control of the actuator that varies the flow rate of the flow source device. Additionally, the controller is able to sample the flow rates of the flow meters at a higher rate than was previously possible using the conventional flow sensing valves.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flow system, comprising:
   a flow source device configured to receive fluid from a first flow line at a first energy and output the fluid on a second flow line at a second energy, the second energy being different from the first energy;
   a first output in fluid communication with the flow source device on the second flow line;
   a first actuation system in fluid communication with the second flow line through a third flow line, the first actuation system having an outlet in fluid communication with the first flow line;
   an actuator coupled to the flow source device, the actuator configured to adjust the second energy of the flow source device;
   a first flow meter disposed on the second flow line, the first flow meter configured to measure a first flow rate in the second flow line without bypassing any fluid to the first flow line;
   a controller in communication with the flow source device, the first flow meter, and the actuator;
   wherein the controller is configured to actuate the actuator to adjust the flow source device to achieve a desired flow rate at the first output based at least in part on a condition of the flow source device and the first flow rate measured by the first flow meter;
   wherein the first actuator system comprises at least one servo actuator, wherein the controller is in communication with the at least one servo actuator, wherein the controller computes an estimated flow rate through the at least one servo actuator based on an actuation position of the servo actuator, and wherein the controller is configured to actuate the actuator to adjust the flow source device to achieve the desired flow rate at the first output based also at least in part on the estimated flow rate.

2. The flow system of claim 1, wherein the first flow meter is one of an ultrasonic flow meter, Coriolis flow meter, turbine flow meter, momentum flow meter, angular momentum flow meter, orifice flow meter, strain gauge flow meter, optical flow meter, thermal dispersion flow meter, positive displacement flow meter, electromagnetic flow meter, flow sense valve, vortex shedding flow meter, oscillating jet flow meter, and differential lift flow meter.

3. The flow system of claim 1, wherein the first flow meter has a bandwidth of at least 10 Hz.

4. The flow system of claim 1, wherein the controller is configured to sample the flow rate measured by the first flow meter every 0.1 seconds or faster.

5. The flow system of claim 1, wherein the actuator is an electromagnetic actuator.

6. The flow system of claim 1, further comprising a second output in fluid communication with the flow source device;
   wherein the first flow rate measured by the first flow meter is an aggregate flow rate of fluid flowing to the first output and to the second output.

7. The flow system of claim 1, wherein the controller comprises an open loop gain margin of at least 6 dB.

8. The flow system of claim 1, wherein the controller comprises an open loop phase margin of at least 45°.

9. The flow system of claim 1, wherein the flow source device is a rotary displacement pump, a reciprocating displacement pump, a centrifugal pump, a jet pump, an electromagnetic pump, an accumulator, or a potential energy pump.

10. The flow system of claim 1, wherein the condition of the flow source device is at least one of a rotational speed, an axial speed, a rotational position, an axial position, an inlet pressure, an outlet pressure, a cam position, a swash plate position, a displacement, a fluid temperature at an inlet of the flow source device, or a fluid temperature at an outlet of the flow source device.

11. The flow system of claim 1, wherein the first output is a fuel manifold of an aircraft and wherein the first actuation system controls an end effector of the aircraft.

12. A flow system, comprising:
    a flow source device configured to receive fluid from a first flow line at a first energy and output the fluid on a second flow line at a second energy, the second energy being different from the first energy;
    a first output in fluid communication with the flow source device on the second flow line;
    a first actuation system in fluid communication with the second flow line through a third flow line, the first actuation system having an outlet in fluid communication with the first flow line;
    an actuator coupled to the flow source device, the actuator configured to adjust the second energy of the flow source device;
    a first flow meter disposed on the second flow line, the first flow meter configured to measure a first flow rate in the second flow line without bypassing any fluid to the first flow line;
    a controller in communication with the flow source device, the first flow meter, and the actuator;
    wherein the controller is configured to actuate the actuator to adjust the flow source device to achieve a desired flow rate at the first output based at least in part on a condition of the flow source device and the first flow rate measured by the first flow meter;

a second flow meter disposed on the third flow line, the second flow meter configured to measure a second flow rate in the third flow line without bypassing any fluid to the first flow line;

wherein the controller is configured to actuate the actuator to adjust the flow source device to achieve the desired flow rate at the first output based also at least in part on the second flow rate measured by the second flow meter.

13. The flow system of claim 12, further comprising a second actuation system in fluid communication with the second flow line through the third flow line;

wherein the second flow rate measured by the second flow meter is an aggregate flow rate of fluid flowing to the first actuation system and to the second actuation system.

14. The flow system of claim 12, further comprising a second actuation system in fluid communication with the second flow line and a third flow meter configured to measure a third flow rate of fluid flowing through the second actuation system;

wherein the second flow rate measured by the second flow meter is only of fluid flowing through the first actuation system;

wherein the controller is configured to actuate the actuator to adjust the second flow rate of the flow source device to achieve the desired flow rate at the first output based also at least in part on the flow rate measured by the second flow meter and the third flow rate measured by the third flow meter.

15. The flow system of claim 12, wherein the first flow meter is one of an ultrasonic flow meter, Coriolis flow meter, turbine flow meter, momentum flow meter, angular momentum flow meter, orifice flow meter, strain gauge flow meter, optical flow meter, thermal dispersion flow meter, positive displacement flow meter, electromagnetic flow meter, flow sense valve, vortex shedding flow meter, oscillating jet flow meter, and differential lift flow meter.

16. The flow system of claim 12, wherein the first flow meter has a bandwidth of at least 10 Hz.

17. The flow system of claim 12, wherein the controller is configured to sample the flow rate measured by the first flow meter every 0.1 seconds or faster.

18. The flow system of claim 12, wherein the actuator is an electromagnetic actuator.

19. The flow system of claim 12, further comprising a second output in fluid communication with the flow source device;

wherein the first flow rate measured by the first flow meter is an aggregate flow rate of fluid flowing to the first output and to the second output.

20. The flow system of claim 12, wherein the controller comprises an open loop gain margin of at least 6 dB.

21. The flow system of claim 12, wherein the controller comprises an open loop phase margin of at least 45°.

22. The flow system of claim 12, wherein the flow source device is a rotary displacement pump, a reciprocating displacement pump, a centrifugal pump, a jet pump, an electromagnetic pump, an accumulator, or a potential energy pump.

23. The flow system of claim 12, wherein the condition of the flow source device is at least one of a rotational speed, an axial speed, a rotational position, an axial position, an inlet pressure, an outlet pressure, a cam position, a swash plate position, a displacement, a fluid temperature at an inlet of the flow source device, or a fluid temperature at an outlet of the flow source device.

24. The flow system of claim 12, wherein the first output is a fuel manifold of an aircraft and wherein the first actuation system controls an end effector of the aircraft.

25. A flow system, comprising:

a flow source device configured to receive fluid from a first flow line at a first energy and output the fluid on a second flow line at a second energy, the second energy being different from the first energy;

a first output in fluid communication with the flow source device on the second flow line;

a first actuation system in fluid communication with the second flow line through a third flow line, the first actuation system having an outlet in fluid communication with the first flow line;

an actuator coupled to the flow source device, the actuator configured to adjust the second energy of the flow source device;

a first flow meter disposed on the second flow line, the first flow meter configured to measure a first flow rate in the second flow line without bypassing any fluid to the first flow line;

a controller in communication with the flow source device, the first flow meter, and the actuator;

wherein the controller is configured to actuate the actuator to adjust the flow source device to achieve a desired flow rate at the first output based at least in part on a condition of the flow source device and the first flow rate measured by the first flow meter;

a second output in fluid communication with the flow source device and a second flow meter configured to measure a second flow rate of fluid flowing to the second output;

wherein the first flow rate measured by the first flow meter is only of fluid flowing to the first output;

wherein the controller is configured to actuate the actuator to adjust the flow source device to achieve desired flow rates at the first output and the second output based at least in part on the first flow rate measured by the first flow meter and the second flow rate measured by the second flow meter.

26. A method of controlling a flow system, comprising:

changing energy of a fluid flowing through a flow source device to an output, the fluid passing through a first flow line into the flow source device and a second flow line out of the flow source device to the output;

directing a portion of the fluid on the second flow line through a first actuation system on a third flow line, the first actuation system having an outlet in fluid communication with the first flow line;

monitoring a first flow rate of fluid flowing through the second flow line using a first flow meter, wherein no fluid is bypassed from the second flow line to the first flow line by the first flow meter during monitoring;

controlling a desired flow rate at the output by adjusting the flow source device using an actuator, the controlling being based at least in part on the first flow rate monitored by the first flow meter and a condition of the flow source device;

wherein the monitoring further comprises:

monitoring a second flow rate of fluid flowing through the third flow line using a second flow meter, wherein no fluid is bypassed from the third flow line to the first flow line by the second flow meter during monitoring; and wherein the controlling further comprises:
controlling the desired flow rate based also at least in part on the second flow rate monitored by the second flow meter.

27. The method of claim 26, wherein controlling further comprises sampling the first flow rate every 0.1 seconds or faster using a controller.

28. The method of claim 26, wherein controlling further comprises electromagnetically actuating the actuator to adjust the flow source device.

* * * * *